United States Patent [19]

Husbands

[11] Patent Number: 4,805,234
[45] Date of Patent: Feb. 14, 1989

[54] LOW COST FIBER OPTIC NETWORK NODE
[75] Inventor: Charles R. Husbands, Acton, Mass.
[73] Assignee: The Mitre Corporation, Bedford, Mass.
[21] Appl. No.: 913,682
[22] Filed: Sep. 30, 1986
[51] Int. Cl.$^4$ ............................................. H04B 9/00
[52] U.S. Cl. ...................................... 455/607; 455/601
[58] Field of Search ............... 455/607, 601, 617, 606, 455/600

[56]  References Cited
U.S. PATENT DOCUMENTS
4,628,501  12/1986  Loscoe ................................. 455/612

*Primary Examiner*—Robert L. Griffin
*Assistant Examiner*—Leslie Van Beek
*Attorney, Agent, or Firm*—Wolf, Greenfield & Sacks

[57]  ABSTRACT

The node includes plural optical receivers and transmitters. Each receiver and each transmitter of the node is connected to a user terminal by fiber optic cables. The output of each of the node receivers is electrically combined. Splitting logic is also included for splitting the electrical output of the receivers to serve as an input to the plural optical transmitters. The node may be used as an expansion mode or as a head-end unit. The optical receivers and transmitters have a low cost so that the overall node is approximately one fifth the cost of comparable nodes utilizing passive optical stars.

2 Claims, 2 Drawing Sheets

ACTIVE STAR NODE USING LOW COST COMPONENT TECHNOLOGY

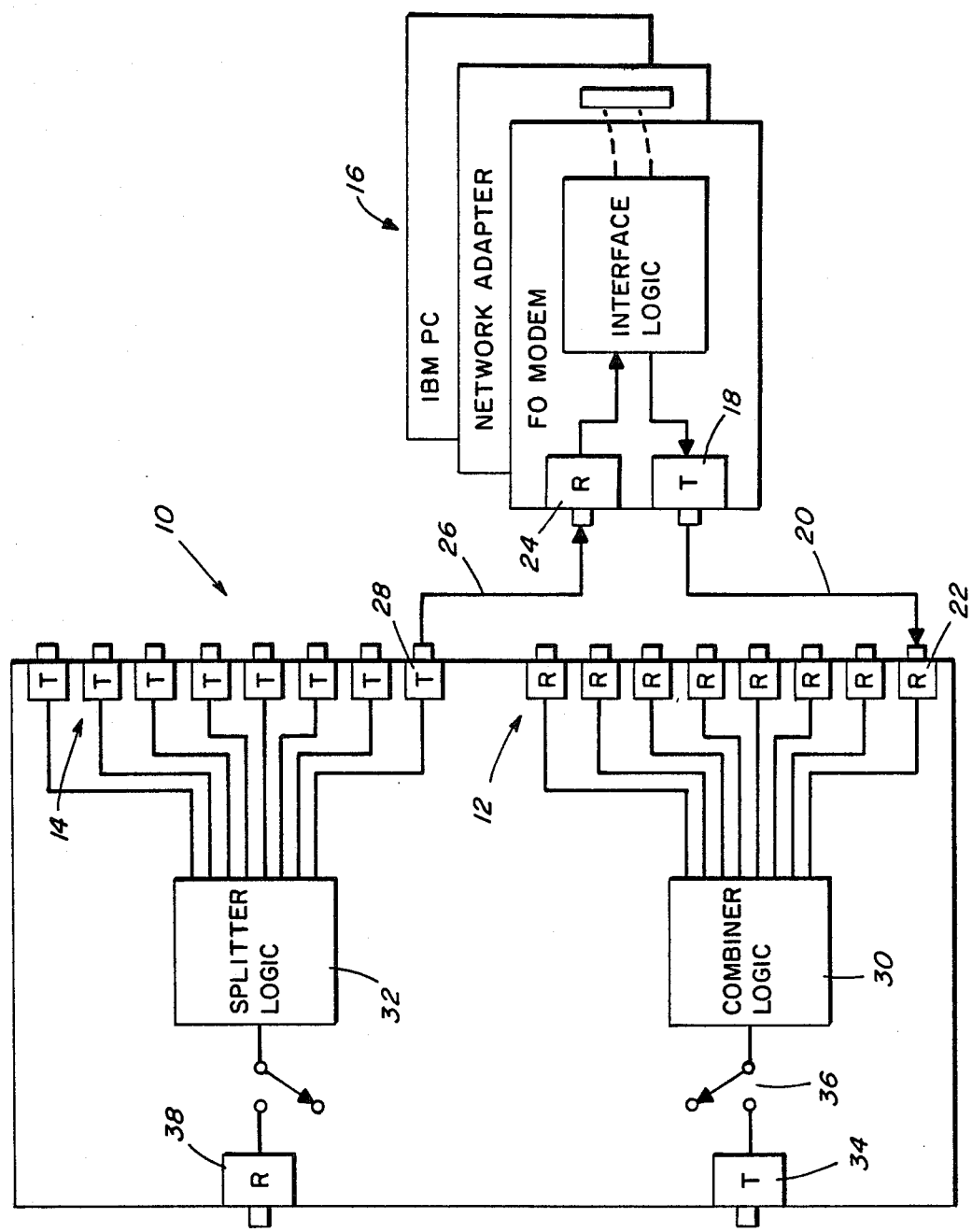
FIG. 1 ACTIVE STAR NODE USING LOW COST COMPONENT TECHNOLOGY

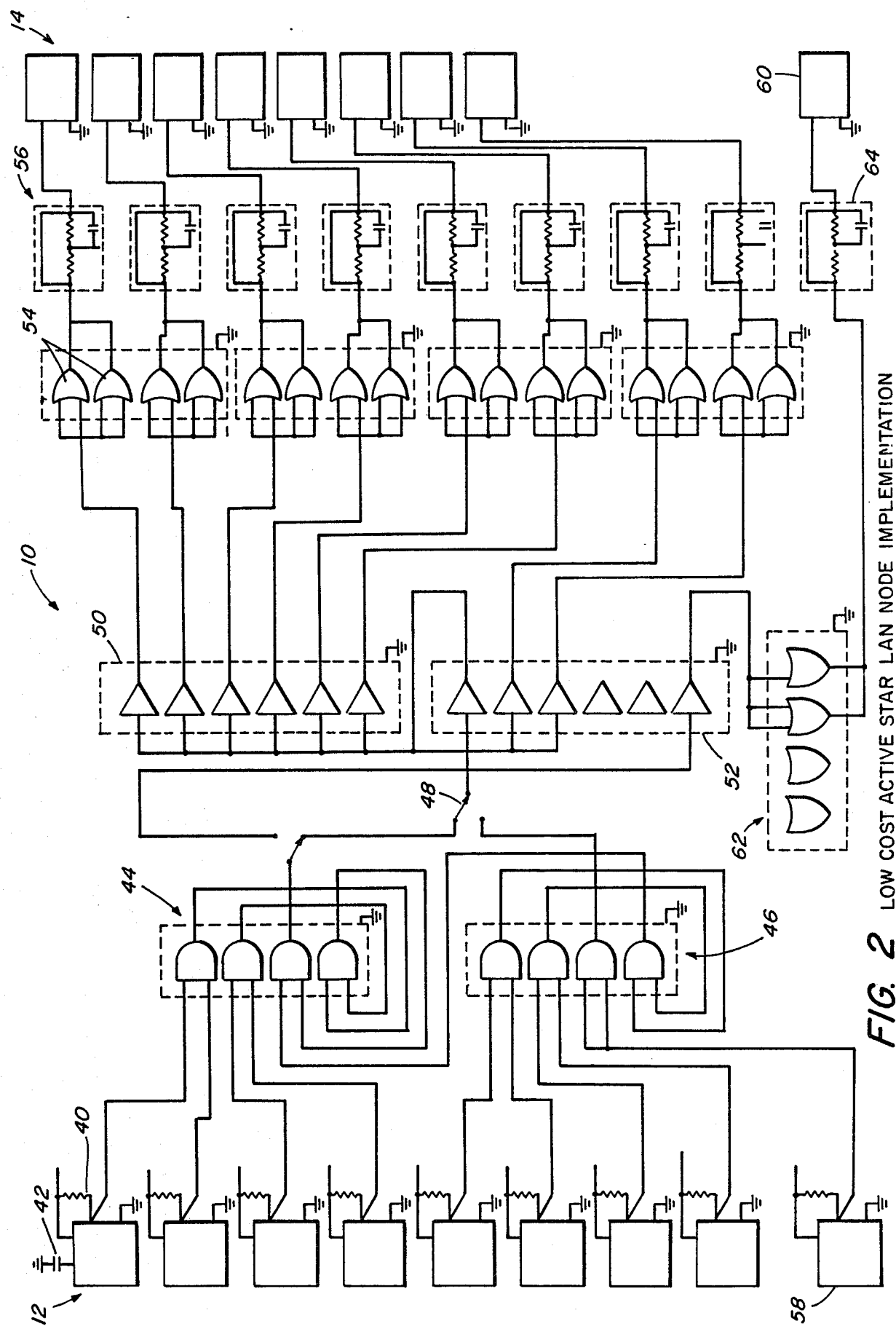
FIG. 2 LOW COST ACTIVE STAR LAN NODE IMPLEMENTATION

LOW COST FIBER OPTIC NETWORK NODE

BACKGROUND OF THE INVENTION

This invention relates to optical local area networks, and more particularly to a low cost active node design.

Over the last several years, a number of local area network architectures have evolved to support data communications for a large user population. With the recent emergence of the personal computer, network control cards have been developed to permit these computers to be used as intelligent work stations for local area network applications. Most of these local area network cards employ coaxial cable as the transmission medium. This transmission medium has been used in both the baseband and broadband modes. With the rapid emergence of fiber optic technology, optical fiber has been examined as an alternative to coaxial cable in a number of local area network designs. Recently, several fiber optic components have been developed that can dramatically reduce the cost of integrating this technology into local area network designs.

In U.S. Ser. No. 777,934, filed Sept. 19, 1985, there is disclosed and claimed an active star network node design employing passive optical stars. The teachings of U.S. Ser. No. 777,934 are incorporated herein by reference. Although active star nodes employing optical stars can accommodate high data rate protocols such as Ethernet, these nodes are quite expensive. In addition, the nodes employing passive optical stars are heavy and relatively bulky. Furthermore, the optical star elements suffer splitter losses which degrade system performance.

It is therefore an object of the present invention to provide an optical node which is a fraction of the weight and size of known nodes and having a component cost about one-fifth the known design.

Yet another object of the invention is a low cost node that eliminates the splitter losses associated with nodes employing optical star elements.

SUMMARY OF THE INVENTION

These and other objects of the present invention are achieved by an optical node including a plurality of optical receivers, each receiver connected by fiber optic cables to one of a plurality of user terminals. The electrical outputs of each of the optical receivers are electrically combined. The node also includes a plurality of optical transmitters each of which is connected by fiber optic cables to one of the user terminals. Apparatus is provided for splitting the electrical output of the receivers for driving each of the transmitters. The node may be used both as a head-end or as a repeater.

BRIEF DESCRIPTION OF THE DRAWING

The invention disclosed herein will be understood better with reference to the drawing of which:

FIG. 1 is a block diagram of the active node disclosed herein; and

FIG. 2 is a block diagram of a hardware implementation of the node.

DESCRIPTION OF THE PREFERRED EMBODIMENT

Active optical nodes can be configured to serve both as head-end nodes and repeater nodes. When configured as a head-end, the node receives information from user terminals and rebroadcasts this information to all of the user terminals on the network. When the node is utilized in the repeater or concentrator mode, the information is transmitted to a higher order node. In late 1985, fiber optic components suitable for integration into a local area network implementation were introduced. See, D. W. Tsui, "New Family of Miniature Fiber Optic Components Designed to Save You Money", the 9th International Fiber Optic Communications and Local Area Network Exposition (FOC/LAN 85), pp. 171, September 1985. With the availability of these low cost components, it became evident that a very affordable network node could be produced. In particular, low cost optical receivers and transmitters became available. An active star node 10 using low cost components is shown in FIG. 1. The node 10 includes a plurality of optical receivers 12 and a plurality of optical transmitters 14. In FIG. 1, a single user terminal 16 is connected to the node 10. In particular, a transmitter 18 of the user terminal 16 is connected by a fiber optic cable 20 to a receiver 22. Similarly, a receiver 24 of the user terminal 16 is connected by a fiber optic cable 26 to a transmitter 28. It is to be understood that other user terminals (not shown) would be connected to the remaining receivers 12 and transmitters 14 of the active node 10. Thus, it is seen that in the present implementation, a fiber optic receiver 12 is dedicated to each of the inbound user lines. The outputs of the receivers 12 are electrical signals which are electrically combined in a combiner logic element 30. As shown in FIG. 1, the node 10 is in the head-end configuration so that the combined electrical signal from the combiner logic element 30 is connected to a splitter logic element 32 which distributes the composite electrical signal to the array of optical transmitters 14. The array of optical transmitters 14, such as the optical transmitter 28 broadcasts the signal to each of the attached receivers such as the receiver 24 associated with the user terminal 16. If the node 10 is to be used in a repeater or concentrator mode, the combined electrical signal from the combiner logic element 30 is passed to a dedicated transmitter 34 forming an expansion port by means of a switch 36 so that transmission may proceed toward a higher order node (not shown). Similarly, an expansion port receiver 38 receives signals from a higher order node (not shown) and is converted to electrical format and split by the splitter logic element 32. The array of transmitters 14 then sends an optical signal to each of the users, such as the terminal 16, supported by the node. The low cost node 10 is a fraction of the weight and size of a corresponding node utilizing optical stars, and the component cost is about one-fifth as much. The major advantage of the present design is that the links between the user and the node are now point-point; thus, the system does not suffer the splitter losses attributed to optical star elements. Without these splitter losses, low cost modem to low cost node power margins match almost exactly the power margins that can be obtained from the higher performing modem and node components disclosed in U.S. Ser. No. 777,934. However, the low cost node 10 will support data rates only up to 5 Mb/s. For many applications, this data rate is more than adequate.

A hardware mechanization of the node 10 will now be described in conjunction with FIG. 2. At the left hand side of the logic diagram of FIG. 2 are shown eight receiver units 12. Suitable receivers 12 are manufactured by Hewlett-Packard under the designation HFBR 2402. The only additional components necessary to support each of the receivers are a 2200-ohm pull-up resister 40 and a decoupling capacitor 42. The outputs from each of the receivers 12 are combined in two 7408 quad AND gates 44 and 46. When the head-end/repeater switch 48 is in the head-end position as shown in FIG. 2, the combined receiver signal is sent to a splitter array consisting of two 7404 inverter devices 50 and 52. The inverter devices 50 and 52 invert the signal (compensating for the inversion in the receivers 12) and acts as a driver for the optical transmitters 14. The optical transmitters 14 are driven in a shunt configuration. Suitable transmitters 14 are manufactured by Hewlett-Packard under the designation HFBR 1404. Each of the transmitters 14 is driven by a pair of 74128 line drivers 54 and a resistor/capacitor network 56.

To operate the low cost active star node 10 in the repeater mode, the head-end/repeater switch 48 is set to the EX position. In that position, the receiver information from a ninth receiver 58 associated with an expansion port is used as the drive signal to the eight optical transmitters associated with users' terminal equipment on the node. In a similar manner, the composite information from the eight optical receivers associated with users' equipment on the node is routed to a ninth optical transmitter 60 dedicated to operation on the expansion port. To service this expansion port receiver 58, an additional 74128 logic device 62, and a resistor/capacitor network 64 are required.

A prototype of the node disclosed herein has been constructed at The Mitre Corporation. The logic devices on this prototype model were all mounted on a single wire wrap board and interconnected with standard wire wrap technology. The nine optical transmitters and nine optical receivers were mounted on one wall of the enclosure in transmit/receiver pairs. Only 5 volts were required to power this logic, and this voltage was supplied from a small external supply. The prototype unit was constructed in a cast metal box 7¼ inches long by 4¾ inches wide by 2-inches high.

At present, the bandwidth of the low cost components is restricted to 5 MHz. The fiber optic transmitter described above can perform to 50 MHz, but the receiver design is the limitation. A low cost complementary component is available with just an optical detector and preamplifier that can function at data rates up to 50 MHz. With the availability of such a receiver unit, the technology described in this patent application could be extended to encompass other higher rate protocols such as Ethernet.

It is thus seen that the objects of this invention have been achieved in that there has been disclosed a low cost active node for interconnecting a plurality of user terminals in a fiber optic network. The node uses low cost optical receivers and transmitters and has the advantage that the links between the user and the node are point-point so that the system does not suffer the splitter losses attributed to optical star elements in other node designs. With low cost modems and the active star nodes disclosed herein, the total network cost of fiber optic local area networks becomes attractive when compared with coaxial installations, even at modest data rates. It is recognized that modifications and variations of the present invention will occur to those skilled in the art and it is intended that all such modifications and variations be included within the scope of the appended claims.

What is claimed is:

1. Optical node for interconnecting a plurality of user terminals comprising:
   a plurality of optical receivers, each receiver connected by fiber optic means to one of the user terminals and producing an electrical output;
   electronic means for combining the electrical output of the plurality of receivers;
   a plurality of optical transmitters, each transmitter connected by fiber optic means to one of the user terminals;
   electronic means for splitting the electrical output of the receivers for driving each of the transmitters,
   an additional receiver and transmitter forming expansion port, and
   means for selectively connecting said electronic combining means to either (i) said electronic splitting means for operation of said optical node in a head-end mode, or (ii) to the transmitter of said expansion port and connecting said receiver of said expansion port to said electronic splitting means for operation in a repeater mode.

2. Local area optical network comprising:
   A. a plurality of user terminals, each terminal including an optical transmitter and an optical receiver; and
   B. an optical node connected by fiber optic means to the transmitter and receiver of the plurality of user terminals, the optical node including:
      (i) a plurality of optical node receivers, each node receiver connected to the transmitter of one of the user terminals and producing an electrical output;
      (ii) electronic means for combining the electrical output of the plurality of node receivers;
      (iii) a plurality of optical node transmitters, each node transmitter connected to the receiver of one of the user terminals;
      (iv) electronic means for splitting the electrical output of the node receivers for driving each of the node transmitters;
   an additional receiver and transmitter forming expansion port, and
   means for selectively connecting said electronic combining means to either (i) said electronic splitting means for operation of said optical node in a head-end mode, or (ii) to the transmitter of said expansion port and connecting said receiver of said expansion port to said electronic splitting means for operation in a repeater mode.

* * * * *